Patented Mar. 9, 1948

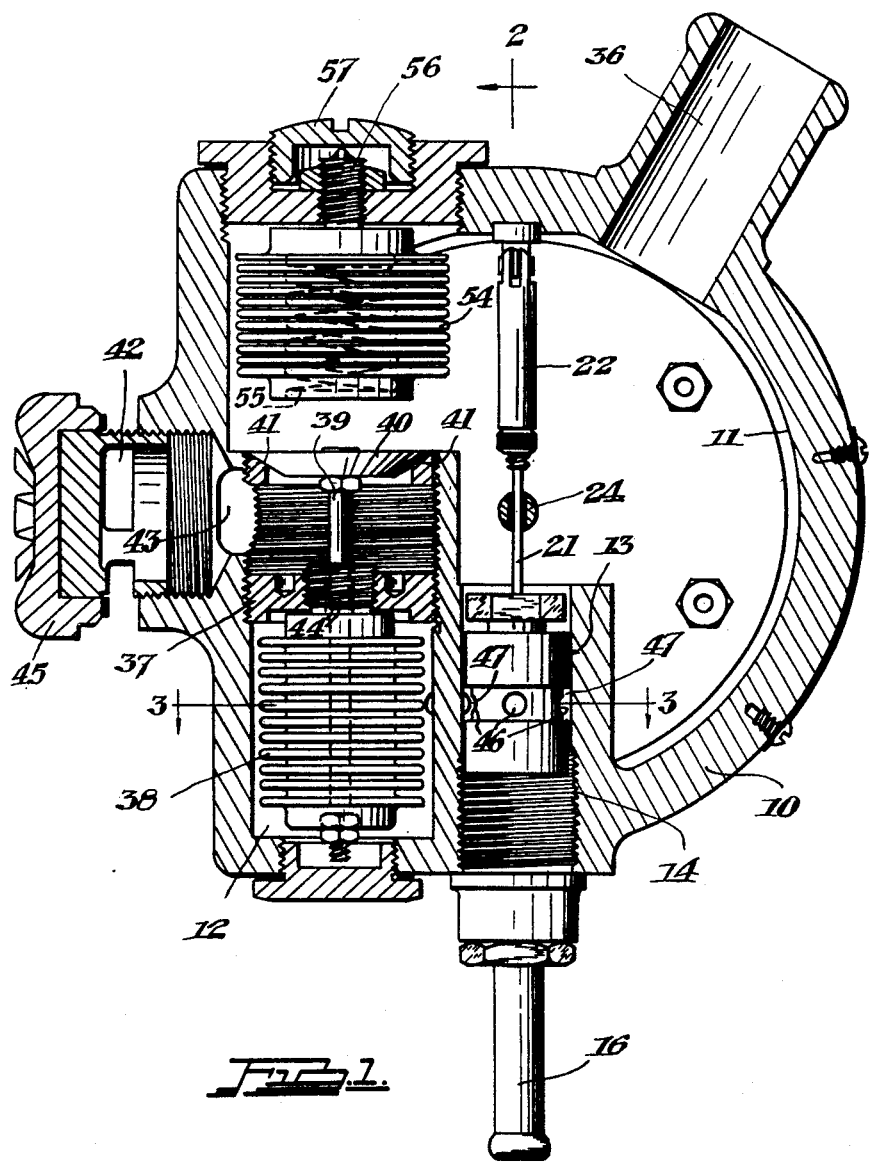

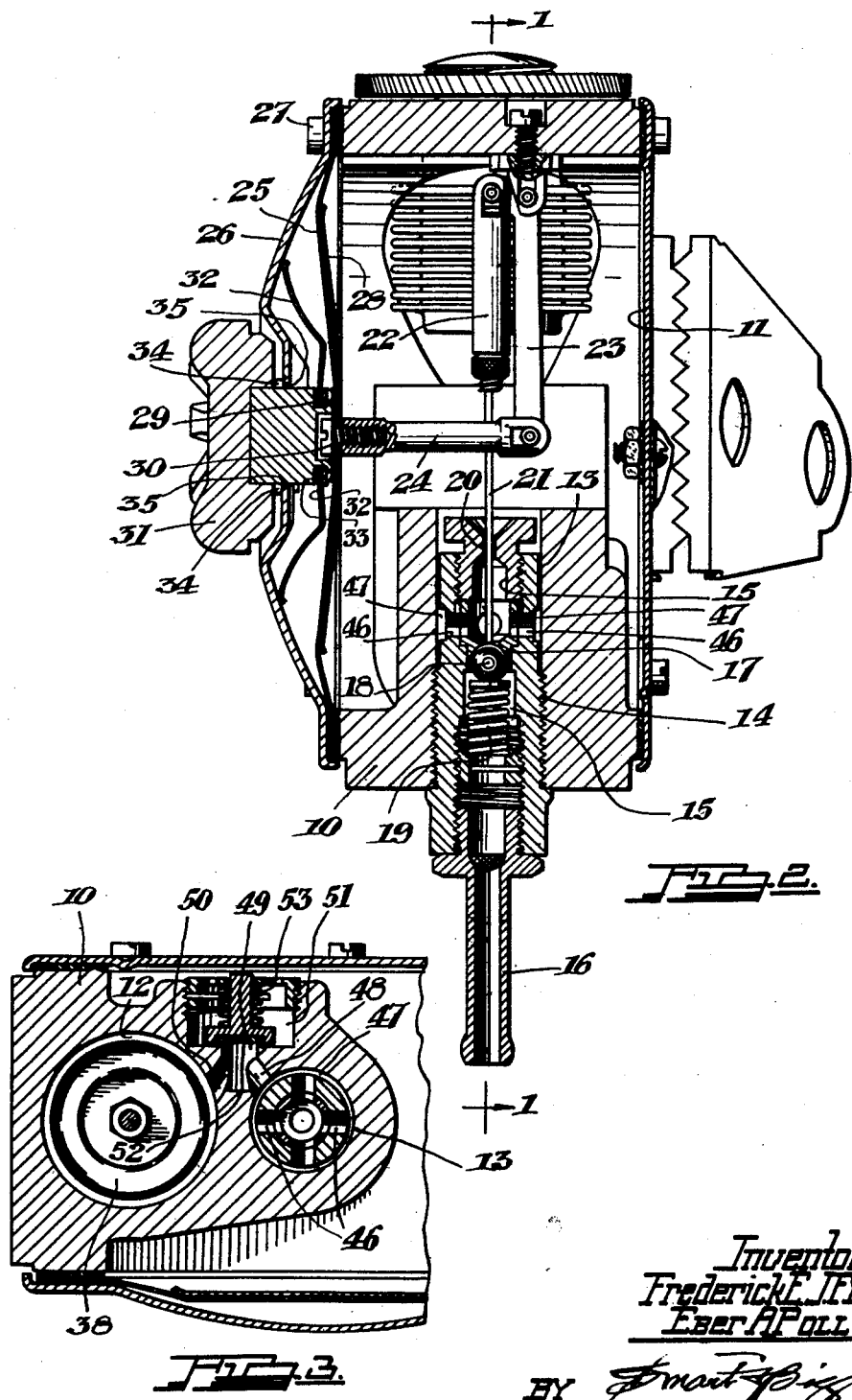

2,437,462

UNITED STATES PATENT OFFICE 2,437,462

DEMAND VALVE

Frederick Ernest Joseph Frye, Weston, Ontario, and Eber Allison Pollard, Ville St. Laurent, Quebec, Canada, assignors to The Honorary Advisory Council for Scientific and Industrial Research, Ottawa, Ontario, Canada, a corporation of Canada Application March 23, 1945, Serial No. 584,292

8 Claims. (Cl. 128—142)

This invention relates to apparatus for mixing gases under different pressures in a proportion dependent on and variable according to demand, and is particularly concerned with air oxygen demand apparatus to be used in combination with respiratory apparatus used at high altitudes.

It is known to provide respiratory apparatus wherein the supply of each of two gases is automatically controlled by atmospheric pressure. Such apparatus has, however, proved inadequate largely because the supply of each gas has been subject to independent control with consequent undesirable variations in the proportions of the gas mixture.

Accordingly, it is an object of the present invention to provide demand apparatus for mixing two gases under different pressures in which the supply of the gas under greater pressure is directly controlled by the demand and the supply of the other gas is controlled by the flow of the gas under greater pressure. More particularly the object of the invention is to provide such an apparatus in which the flow of oxygen is directly controlled by the action of the demand on pressure responsive means and the supply of air is controlled by the flow of oxygen.

A further object of the invention is to provide apparatus of this character including means which act with increasing force as atmospheric pressure decreases to counteract the action of the flow of oxygen in opening air valve supply means whereby at extreme altitude the air supply is completely closed off.

A further object of the invention is to provide a relief valve adapted, when the amount of oxygen demand is large, to open and admit the oxygen in full flow.

The above and other objects of the invention will appear from the following description of the invention with reference to the drawings in which Figure 1 is a section of the apparatus taken on the line 1—1 of Figure 2, Figure 2 is a sectional elevation taken on the line 2-2 of Figure 1 and Figure 3 is a fragmentary section taken on the line 3—3 of Figure 1, showing the communicating passageways between the oxygen inlet and the air valve chamber.

The casing 10 defines a mixing chamber 11, and is provided with two bores defining respectively an air valve chamber 12 and an oxygen valve chamber 13. The latter as appears from Figure 2 is provided with a valve arrangement indicated generally by the reference numeral 14 and includes a passage 15 communicating with an oxygen nipple 16, a valve seat 17, a ball valve 18 and a spring 19 urging the ball against this seat to close off the passage 15. A small passage 20 connects the low side of bore 15 with chamber 11 to allow only a restricted flow of oxygen therebetween when the valve 18 is open.

The ball valve 18 which acts as a check valve is unseated by means of push rod 21, connected through levers 22, 23 and 24 to a light rubberized cloth diaphragm 25, the push rod 21 being moved downwardly to unseat the ball valve 18 when the diaphragm is drawn inwardly on inspiration. In the modification shown, the levers are arranged to give to the diaphragm a mechanical advantage of 8 to 1.

The diaphragm is protected by a dished cover member 26 which is secured to the casing by means of a plurality of screws 27 and presses the periphery of the diaphragm firmly against the casing in order to ensure a tight seal. The diaphragm is backed by disk 28 and at its centre is connected to lever 24 by washer 29 and screw 30.

The knob 31 is an emergency button designed, on being turned through 90° to engage washer 29 to actuate lever 24 and the push rod 21 to open the oxygen valve independently of the diaphragm 25. The knob 31 is provided with a spring member 32 which engages in a groove 33 and urges the knob inwardly toward the lever 24. The knob 31 is also provided with two projections 34 which engage the outer surface of the dished cover plate 26 to hold the knob retracted.

When the knob is turned through 90° projections 34 drop into two valleys (not shown) in the cover plate and the knob 31 moves inwardly under the influence of spring member 32 to actuate the levers 24, 23, 22 and push rod 21.

The diaphragm 25 is open to atmosphere through a clearance 35 between the dished cover plate and the knob and the chamber 11 communicates through a wide outlet 36 to a mask with respiratory passages.

The chamber 12 is divided into two portions by a dividing wall 37 closing off communication of the lower portion with atmosphere. This lower portion houses a pressure responsive metal bellows 38 connected by rod 39 to valve member 40 which is cooperable with valve seat 41 to close off access from the upper portion of the chamber 12 to the mixing chamber 11. This upper portion communicates with the atmosphere by means of inlet 42 and passage 43 and communicates with the interior of the metal bellows 38 by means of the annular passageway 44 surrounding the rod 39. Inlet 42 may be closed by rotating the manually operable closure member 45.

In order to establish communication between the chamber 15 of the oxygen valve mechanism and the closed portion of chamber 12, the valve mechanism is provided above the valve seat 17 with two intersecting transverse bores 46 and an annular groove in line with these bores forming an annular chamber 47. This chamber 47 is then connected to the chamber 12 by means of passage 48, chamber 49 and passage 50, these chambers and passages constituting a by-pass. The bellows is thus subjected to atmospheric pressure internally and to the pressure of oxygen on the outside, the former extending the bellows to seat member 40 and the oxygen pressure, when it overcomes the air pressure, collapsing the bellows to unseat member 40.

As appears from Figure 3 the valve body is provided with a bore 51 which houses a valve member 52 urged by spring 53 against the end of the chamber 49 thereby closing off communication of the chamber 49 with the mixing chamber 11. It will be seen that the bores 46, chamber 47, passage 48 and chamber 49 constitute a by-pass from the low side of valve member 18 to the mixing chamber 11. The purpose of this release valve will be referred to later.

In order to provide a variation in the proportion of oxygen to air in accordance with changes in atmospheric pressure there is provided the pressure responsive metal bellows 54 shown in Figure 1. This bellows is evacuated and contains a spring 55 which extends the bellows as the pressure drops until at a predetermined elevation it contacts the valve member 40. At higher altitudes the spring imposes an increasingly greater load on the valve member 40 thereby increasing the proportion of oxygen to air admitted into chamber 11 as the atmospheric pressure drops. At approximately 30,000 feet the pressure exerted by spring 55 is so great that the air valve member 40 does not open at all so that only oxygen is admitted into chamber 11.

Adjustment of the metal bellows 54 so that it contacts the valve member 40 at the desired altitude and closes it completely at the desired altitude is effected by rotating the screw threaded stem 56 after removing cap 57.

The operation of the device is as follows. On inspiration the diaphragm is drawn inwardly towards the mixing chamber 11 and the ball valve 18 is unseated through the action of the levers 22, 23, and 24 and the rod 21. Oxygen then flows from the nipple 16 through the chamber 47 and to the restricted passageway 20. Because this passageway restricts the flow of oxygen to chamber 11, pressure builds up in the chamber 47, passage 48, chamber 49, passage 50 and the lower portion of the chamber 12. This pressure tends to collapse the metal bellows 38, thereby lifting the valve member 40 from its seat 41. Because the interior of the metal bellows is open to atmosphere the valve member is unseated only when the oxygen pressure is greater than atmospheric pressure. When this is the case air is admitted to the mixing chamber 11 in an amount which is dependent upon the pressure of the oxygen. As the pressure builds up and more air is admitted, so more oxygen is forced through the restricted passageway 20 into the chamber 11 so that the amount of air which is admitted past the valve member 40 is dependent upon the amount of oxygen which is admitted to the chamber 11 until the metal bellows 54 comes into operation, this taking place preferably at approximately 13,000 feet. At greater elevations the proportion, which up to that point has been determined by the size of the restricted opening 20, is gradually increased until at approximately 30,000 feet pure oxygen is being drawn into the mixing chamber 11. When this happens a greater volume of oxygen must be admitted to the chamber 11 than can pass through the restricted passageway 20. It is therefore admitted through the passage 48, chamber 49, the valve member 52, its retaining spring 53 being so arranged that when sufficient pressure builds up behind the restricted passageway 20, the valve member 52 is lifted from its seat and oxygen flows into the chamber 11. At the same time this valve member 52 protects the metal bellows 38 from overloading. In the preferred modification this valve is set to release when the oxygen pressure reaches from 5 to 6 pounds per square inch in the chamber 12.

It will be observed that during expiration a slight pressure builds up behind the diaphragm which helps to ensure the proper seating of the closure members of the air and oxygen valves.

What we claim is:

1. A demand valve for respiratory apparatus, comprising a mixing chamber having an outlet for connection to a mask and at least one inlet passage for each of two gases under different pressures, valve means in connection with each inlet passage for controlling the flow of gas therethrough, spring means normally holding the valve means for the gas under greater pressure in closed position, pressure responsive means operative in response to inspiration to open the spring pressed valve means, a restriction in the inlet passage between the low pressure side of the spring pressed valve means and the mixing chamber, a by-pass from such inlet passage between the spring pressed valve means and said restriction, and pressure responsive means subject on one side to the pressure influence of the gas under less pressure and on the other side to the pressure influence of the gas under greater pressure in said by-pass, said pressure responsive means being operatively connected with the valve means for the gas under less pressure to close said valve means under the pressure influence of the gas under less pressure and to open the said valve means under the pressure influence of the gas under greater pressure in said by-pass.

2. A demand valve for respiratory apparatus comprising a mixing chamber having an outlet, at least one inlet for air and at least one inlet for oxygen under greater than atmospheric pressure, valve means adapted to control the flow of air through its inlet, a pressure differential chamber, valve means adapted to control the flow of oxygen through its inlet, spring means normally holding the valve means for the oxygen inlet closed, pressure responsive means operative in response to inspiration to open the spring pressed valve means, a restriction in the inlet passage between the low pressure side of the spring pressed valve means and the mixing chamber, a by-pass to said pressure differential chamber from the inlet passage between the spring pressed valve means and said restriction, and pressure responsive means in said pressure differential chamber connected to close the air valve means under atmospheric pressure and to open said air valve means under the pressure influence of oxygen in said differential chamber.

3. A demand valve for respiratory apparatus comprising a mixing chamber having an outlet, at least one inlet for air and at least one inlet for oxygen under greater than atmospheric pressure, valve means adapted to control the flow of air through its inlet, a pressure differential chamber, valve means adapted to control the flow of oxygen through its inlet, spring means normally holding the valve means for the oxygen inlet closed, pressure responsive means operative in response to inspiration to open the spring pressed valve means, a restriction in the inlet passage between the low pressure side of the spring pressed valve means and the mixing chamber, a by-pass to said pressure differential chamber from the inlet passage between the spring pressed valve means and said restriction, pressure responsive means in said pressure differential chamber connected to close the air valve means under atmospheric pressure and to open said air valve means under the pressure influence of oxygen in said differential chamber, control means operable to open the spring pressed valve means and hold the same in the open position, and closure means operable to close the air inlet.

4. A demand valve for respiratory apparatus comprising a mixing chamber having an outlet, at least one inlet for air and at least one inlet for oxygen under greater than atmospheric pressure, a valve adapted to control the flow of air through its inlet, a pressure differential chamber, a valve adapted to control the flow of oxygen through its inlet, spring means normally holding the oxygen inlet valve closed, a push rod operable to open the oxygen inlet valve, a diaphragm defining at least a portion of the mixing chamber, lever means connecting the diaphragm to operate the push rod to open the oxygen inlet valve on inspiration, a restriction in the inlet passage between the low pressure side of the oxygen inlet valve and the mixing chamber, a by-pass to said pressure differential chamber from the inlet passage between the oxygen inlet valve and said restriction, and pressure responsive means in said pressure differential chamber connected to close the air inlet valve under atmospheric pressure and to open said valve under the pressure influence of oxygen in said differential chamber.

5. A demand valve for respiratory apparatus comprising a mixing chamber having an outlet, at least one inlet for air and at least one inlet for oxygen under greater than atmospheric pressure, a valve adapted to control the flow of air through its inlet, a pressure differential chamber, a valve adapted to control the flow of oxygen through its inlet, spring means normally holding the oxygen inlet valve closed, a push rod operable to open the oxygen inlet valve, a diaphragm defining at least a portion of the mixing chamber, lever means connecting the diaphragm to operate the push rod to open the oxygen inlet valve on inspiration, a restriction in the inlet passage between the low pressure side of the oxygen inlet valve and the mixing chamber, a by-pass to said pressure differential chamber from the inlet passage between the oxygen inlet valve and said restriction, pressure responsive means in said pressure differential chamber connected to close the air inlet valve under atmospheric pressure and to open said valve under the pressure influence of oxygen in said differential chamber, and control means manually operable to set the lever means and push rod to open the oxygen inlet valve and maintain it in that position.

6. A demand valve for respiratory apparatus comprising a mixing chamber having an outlet, at least one inlet for air and at least one inlet for oxygen under greater than atmospheric pressure, valve means adapted to control the flow of air through its inlet, a pressure differential chamber, valve means adapted to control the flow of oxygen through its inlet, spring means normally holding the valve means for the oxygen inlet closed, pressure responsive means operative in response to inspiration to open the spring pressed valve means, a restriction in the inlet passage between the low pressure side of the spring pressed valve means and the mixing chamber, a by-pass to said pressure differential chamber from the inlet passage between the spring pressed valve means and said restriction, pressure responsive means in said pressure differential chamber connected to close the air valve means under atmospheric pressure and to open said air valve means under the pressure influence of oxygen in said differential chamber, a further by-pass from the inlet passage between the spring pressed valve means and said restriction, said by-pass leading to the mixing chamber, and spring pressed valve means normally closing said by-pass and adapted to open to admit oxygen direct to the mixing chamber from said by-pass when the oxygen pressure built up therein exceeds a predetermined value.

7. A demand valve for respiratory apparatus comprising a mixing chamber having an outlet, at least one inlet for air and at least one inlet for oxygen under greater than atmospheric pressure, valve means adapted to control the flow of air through its inlet, a pressure differential chamber, valve means adapted to control the flow of oxygen through its inlet, spring means normally holding the valve means for the oxygen inlet closed, pressure responsive means operative in response to inspiration to open the spring pressed valve means, a restriction in the inlet passage between the low pressure side of the spring pressed valve means and the mixing chamber, a by-pass to said pressure differential chamber from the inlet passage between the spring pressed valve means and said restriction, pressure responsive means in said pressure differential chamber connected to close the air valve means under atmospheric pressure and to open said air valve means under the pressure influence of oxygen in said differential chamber, and pressure responsive means in said mixing chamber adapted to impose a load tending to close the air valve means, and increasing as the pressure of air admitted to the mixing chamber diminishes.

8. A demand valve for respiratory apparatus comprising a mixing chamber having an outlet, at least one inlet for air and at least one inlet for oxygen under greater than atmospheric pressure, valve means adapted to control the flow of air through its inlet, a pressure differential chamber, valve means adapted to control the flow of oxygen through its inlet, spring means normally holding the valve means for the oxygen inlet closed, pressure responsive means operative in response to inspiration to open the spring pressed valve means, a restriction in the inlet passage between the low pressure side of the spring pressed valve means and the mixing chamber, a by-pass to said pressure differential chamber from the inlet passage between the spring pressed valve means and said restriction, pressure responsive means in said pressure differential chamber connected to close the air valve means under atmospheric pressure and to open said air valve means under the pressure influence of oxygen in said differential chamber, and pressure responsive means in said mixing chamber adapted to impose a load tending to close the air valve means, and increasing as the pressure of air admitted to the mixing chamber diminishes, said means comprising evacuated extensible bellows adapted when extended to engage the air valve means and urge the same to closed position, said bellows being collapsible by pressure within the mixing chamber, and spring means urging the bellows to extend.

FREDERICK ERNEST JOSEPH FRYE.
EBER ALLISON POLLARD.

REFERENCES CITED

The following references are of record in the file of this patent:

UNITED STATES PATENTS

| Number | Name | Date |
| --- | --- | --- |
| 1,213,159 | Dalen | Jan. 23, 1917 |
| 1,695,930 | Schroder | Dec. 18, 1928 |
| 2,269,500 | Wildhack | Jan. 13, 1942 |
| 2,310,189 | Deming | Feb. 2, 1943 |
| 2,343,231 | Talley | Feb. 29, 1944 |
| 2,384,669 | Fields | Sept. 11, 1945 |